United States Patent [19]
Zheng

[11] Patent Number: 5,421,614
[45] Date of Patent: Jun. 6, 1995

[54] AUTOMOBILE SEAT BELT ADJUSTER

[76] Inventor: Yu Zheng, 1065 Howard Ave., Covina, Calif. 91722

[21] Appl. No.: 223,155

[22] Filed: Apr. 5, 1994

[51] Int. Cl.⁶ .................................................. B60R 22/00
[52] U.S. Cl. ................................. 280/801.1; 280/808; 297/482; 297/483
[58] Field of Search .......................... 280/808, 801.1; 297/464, 468, 482, 483, 486, 488, 470

[56] References Cited

U.S. PATENT DOCUMENTS

| | | | |
|---|---|---|---|
| 5,135,257 | 8/1992 | Short | 280/808 |
| 5,213,366 | 5/1993 | Sweger, Jr. | 280/808 |
| 5,335,957 | 8/1994 | Golder | 297/482 |

FOREIGN PATENT DOCUMENTS

| | | | |
|---|---|---|---|
| 2617506 | 11/1977 | Germany | 297/470 |
| WO92-16394 | 10/1992 | WIPO | |

Primary Examiner—Eric D. Culbreth
Attorney, Agent, or Firm—Raymond Sun

[57] ABSTRACT

A seat belt adjuster is adapted to receive a conventional seat belt and pulls the seat belt to a position around the child's waist so that the shoulder strap does not extend across and interfere with the child's face. The seat belt adjuster comprises a body panel forming two half panels. The two half panels are stitched along a central portion of the half panels to form a channel between the two half panels. A first opening and a second opening are spaced apart on the first side of the half panels. A third opening and a fourth opening are spaced apart on the second side of the half panels. All four openings communicate with the channel. Detachable flaps are provided for spacing the first opening apart from the second opening, and for spacing the third opening apart from the fourth opening. The flaps also operate to prevent the latch plate of the seat belt from sliding back into the channel. In an alternative embodiment, the seat belt adjuster provides a panel having a plurality of straps provided along a central portion of the panel to secure the shoulder strap and the waist strap to the panel.

8 Claims, 6 Drawing Sheets

AUTOMOBILE SEAT BELT ADJUSTER

BACKGROUND OF THE INVENTION

1. Field of the Invention

The present invention relates to an automobile seat belt adjuster, and specifically, a seat belt adjuster adapted for use with children. The seat belt adjuster is adapted to receive a conventional seat belt and pulls the seat belt to a position around the child's shoulder and waist/abdomen so that the seat belt does not extend across and interfere with the child's face.

2. Description of the Prior Art

Conventional three-point automobile seat belts are normally provided with one original strap with a latch plate slidably positioned therealong. When pulled, the latch plate divides the original strap into two straps, a waist strap and a shoulder harness or strap. To use the seat belt, an individual pulls the latch plate and fastens the latch plate to a buckle secured to a side of the automobile seat. When the latch plate is pulled, it slides along the original strap to adjust the respective lengths of the waist strap and the shoulder strap to the body size of the individual. When the latch plate is fastened to the buckle, the waist or abdomen strap is wrapped around the individual's waist to prevent the individual from being dislodged from the seat in the event of an accident. The shoulder strap is wrapped around the individual's shoulder and chest to prevent the individual's upper body and head from being thrown forward into the windshield.

In the above description, the terminology "waist strap" was used to describe the strap which secures the lower body of the individual to the seat. Depending on the physique of a particular individual, this strap may either be wrapped around the individual's waist or abdomen. In either case, this strap performs the same function, hence the terminology "waist strap" shall be used hereinafter to refer to this strap.

Conventional automobile seat belts are well-adapted for use with adults of normal height. However, these conventional seat belts are not well suited for individuals who are very short in height, such as, for example, children who have out-grown conventional restraining devices (hereinafter referred to as "child" or "children"). When a conventional seat belt is fastened in place by a child, the slidable latch plate adjusts in a manner which allows for the waist strap to securely hold the child's lower body in the seat. However, the shoulder strap will typically extend across the child's face because his or her upper body is not quite as long as that of a taller individual.

A shoulder strap which overhangs a child's face is very annoying and uncomfortable. This is undesirable because it discourages the use of the seat belt, which is dangerous. Alternatively, to avoid the overhanging shoulder strap, a child may move the shoulder strap behind his or her back so that it does not interfere with his or her face. However, this would defeat the purpose of a shoulder strap since the child's face and upper body can still be thrown forward in an accident.

Attempts have been made to address this problem. WO 92/16394 to Thomas J. Golder describes, in the "Background of the Invention" section, attempts that have been made to modify the shoulder harness or strap of conventional seat belts. WO 92/16394 itself describes restraint devices that comprise a tubular guide member defining a longitudinal passageway for receiving and engaging both the shoulder strap and the waist strap of a conventional three-point seat belt. For example, the restraint device 210 in FIGS. 11 and 12 provides a channel 240 which is defined by rivets 280. The channel 240 spaces the shoulder strap S from the inlet 290 through which the waist strap L is fitted. Unfortunately, the restraint devices of WO 92/16394 suffer from the drawback that they are not easy to use. For example, in the restraint device 210 of FIGS. 11 and 12, unless the latch plate of the seat belt is gripped by the user when in use, the resiliency of the seat belt will cause the latch plate to slide back into the longitudinal passageway 235 and be caught therein. The user must then use his or her hand to reach into the longitudinal passageway 235 to retrieve the latch plate before unfastening the rivets 280 to remove the seat belt from the restraint device 210. This can be annoying and sometimes confusing to the user, especially when the user is trying to position the restraint device prior to fastening the latch plate in the buckle. Since such restraint devices are usually used by children, it is important that their operation be simple so that children will be encouraged to use them properly.

Thus, there remains a need for a device which is adaptable for use with a conventional seat belt for adjusting the position of the shoulder strap so that it does not interfere with a child's face, which is simple in construction, is easy for children to use, and which may be easy and less expensive to manufacture.

SUMMARY OF THE DISCLOSURE

The objects of the present invention may be achieved by providing a seat belt adjuster for use with an automobile seat belt. The seat belt adjuster, in a first preferred embodiment, comprises a body panel having an inside panel and an outside panel stitched along the surrounding edges thereof to define a cavity therebetween. A padding is provided in the cavity. The body panel is folded along a center fold line to form two half panels, each half panel further comprising a left first side and a right second side. Means are provided along a central portion of the two half panels to form a channel between the two half panels. A first opening and a second opening are spaced apart on the first side of the half panels. A third opening and a fourth opening are spaced apart on the second side of the half panels. All four openings communicate with the channel. First means are provided for spacing the first opening apart from the second opening, and second means are provided for spacing the third opening apart from the fourth opening.

In use, the first opening is adapted to receive the shoulder strap, and the second opening is adapted to receive the waist strap with the latch plate exiting the body panel through the fourth opening. Alternatively, the seat belt adjuster according to the first embodiment of the present invention can also be used from the other side with the third opening adapted to receive the shoulder strap, the fourth opening adapted to receive the waist strap, and with the latch plate exiting the body panel through the second opening.

The first and second spacing means each comprises a flap attached to one half panel and adapted to be removably attached to the other half panel. Alternatively, the first and second spacing means may comprise opposing VELCRO pads positioned on the inside panel. The first and second spacing means also operate as means for reducing the size of the second and fourth openings to prevent the latch plate from sliding back into the channel.

The means for forming a channel may comprise a stitch line, or, in a second preferred embodiment of the present invention, may comprise a detachable flap attached to one half panel and adapted to be removably attached to the other half panel.

The objects of the present invention are also achieved by a method of adjusting the height of a shoulder strap of a seat belt so that the shoulder strap does not interfere with an individual's face when he or she is seated in an automobile seat. The method comprises the step of (a) providing a seat belt adjuster comprising (i) a body panel forming two half panels, each half panel comprising an inside panel, a left first side and a right second side, with (ii) means provided along a central portion of the two half panels to form a channel between the two half panels, (iii) a first opening and a second opening spaced apart on the first side of the half panels and communicating with the channel, (iv) a third opening and a fourth opening spaced apart on the second side of the half panels and communicating with the channel, (v) first detachable means for spacing the first opening apart from the second opening, and (vi) second detachable means for spacing the third opening apart from the fourth opening. The method further comprises the steps of (b) detaching the first and second detachable spacing means, (c) pulling the latch plate and inserting the seat belt through the channel from the first side of the half panels so that the latch plate extends out through the fourth opening, (d) engaging the second detachable spacing means to prevent the latch plate from sliding back into the channel, (e) spacing the waist strap apart from the shoulder strap, (f) positioning the seat belt adjuster at the individual's waist portion, and (g) fastening the latch plate to a buckle adjacent the automobile seat.

The seat belt adjuster according to a third preferred embodiment of the present invention comprises a panel having a plurality of straps spaced apart along a central portion of the panel to secure the shoulder strap and the waist strap to the panel, a first detachable strap positioned at a first end of the panel for defining a first opening, a second detachable strap positioned at a second end of the panel for defining a second opening, a third opening defined by the plurality of straps and the first detachable strap, and a fourth opening defined by the plurality of straps and the second detachable strap. The shoulder strap and the waist strap are positioned between the panel and the plurality of straps to secure the shoulder strap and waist strap to the panel.

A method of adjusting the height of a shoulder strap of a seat belt according to the third preferred embodiment of the present invention first comprises the step of providing a seat belt adjuster according to that described above. The method further comprises the steps of (b) detaching the first and second detachable straps, (c) positioning the seat belt between the panel and the plurality of straps so that the latch plate extends out through the second opening, (d) attaching the second detachable strap to prevent the latch plate from sliding therethrough, (e) attaching the first detachable strap to space the waist strap apart from the shoulder strap, (f) positioning the seat belt adjuster at the individual's waist portion, and (g) fastening the latch plate to a buckle adjacent the automobile seat.

Thus, the seat belt adjuster according to the present invention provides a device which is easy to use, and has a simple and effective design by virtue of its spacing means which performs two important functions: (1) to space the waist strap from the shoulder strap, and (2) to prevent the latch plate from sliding back into the channel or through the opening. The seat belt adjuster of the present invention effectively pulls the shoulder strap from the annoying position at an individual's face.

FIG. F is a perspective view of a seat belt adjuster according to a second embodiment of the present invention which shows a portion of the interior of the adjuster.

Figure 6:
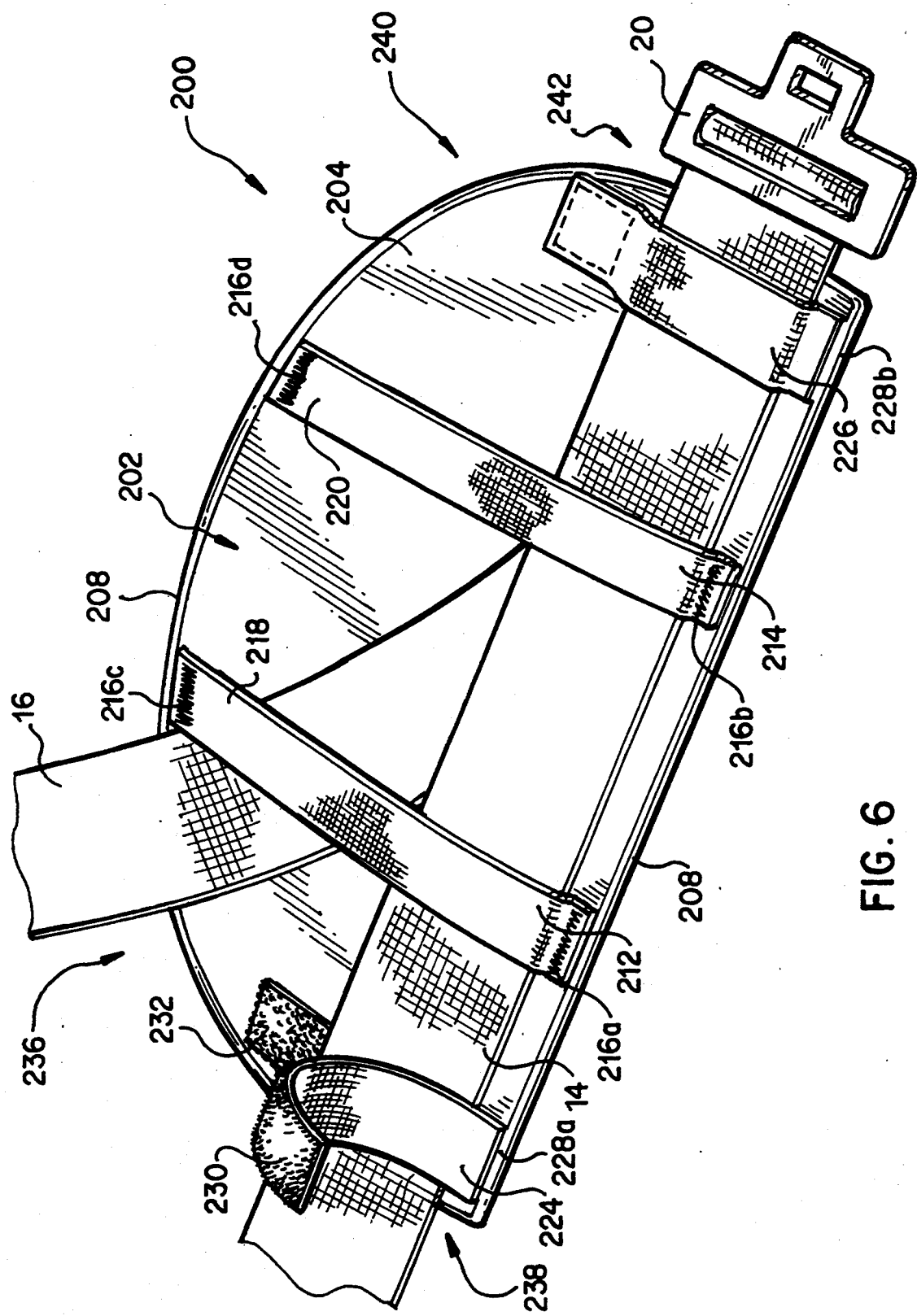

FIG. 6 is a perspective view of a seat belt adjuster according to a third embodiment of the present invention.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
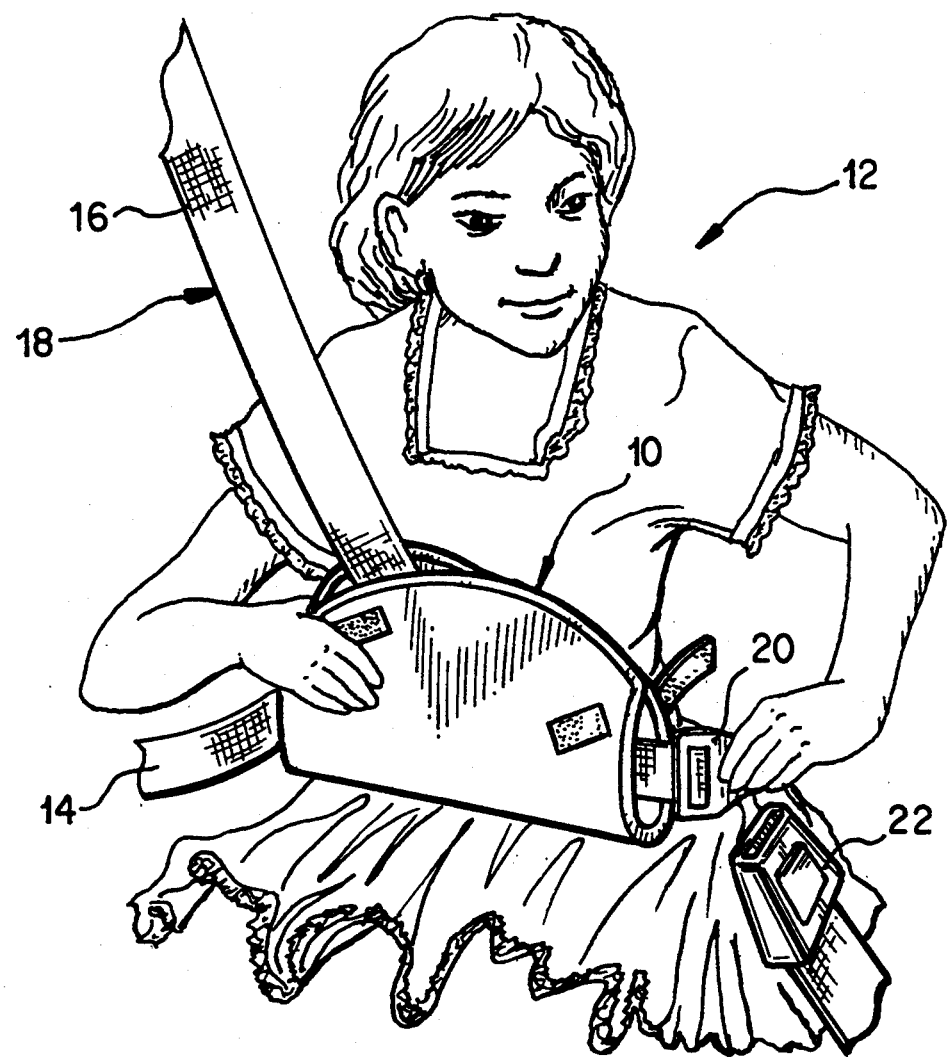
FIG. 1 is a perspective view showing how a seat belt adjuster of the present invention may be used by a child in fastening a seat belt.

As shown in FIG. 1, a seat belt adjuster 10 in accordance with a first embodiment of the present invention is shown being used by an individual 12. In most circumstances, the individual will be a child, but the seat belt adjuster 10 may also be used by a shorter individual. As shown in FIG. 1, the seat belt adjuster 10 has one end which receives the waist strap 14 and the shoulder strap 16 of a seat belt 18, and a second end from which the combined straps and the latch plate 20 extend. The seat belt adjuster 10 operates to force the shoulder strap 16 downwards so that it does not extend across the child's 12 face. The seat belt adjuster 10 rests comfortably at the waist or abdomen of the child 12. The latch plate 20 can be easily fastened into a buckle 22 on the side of the automobile seat to secure the seat belt 18 in place.

Figure 2:
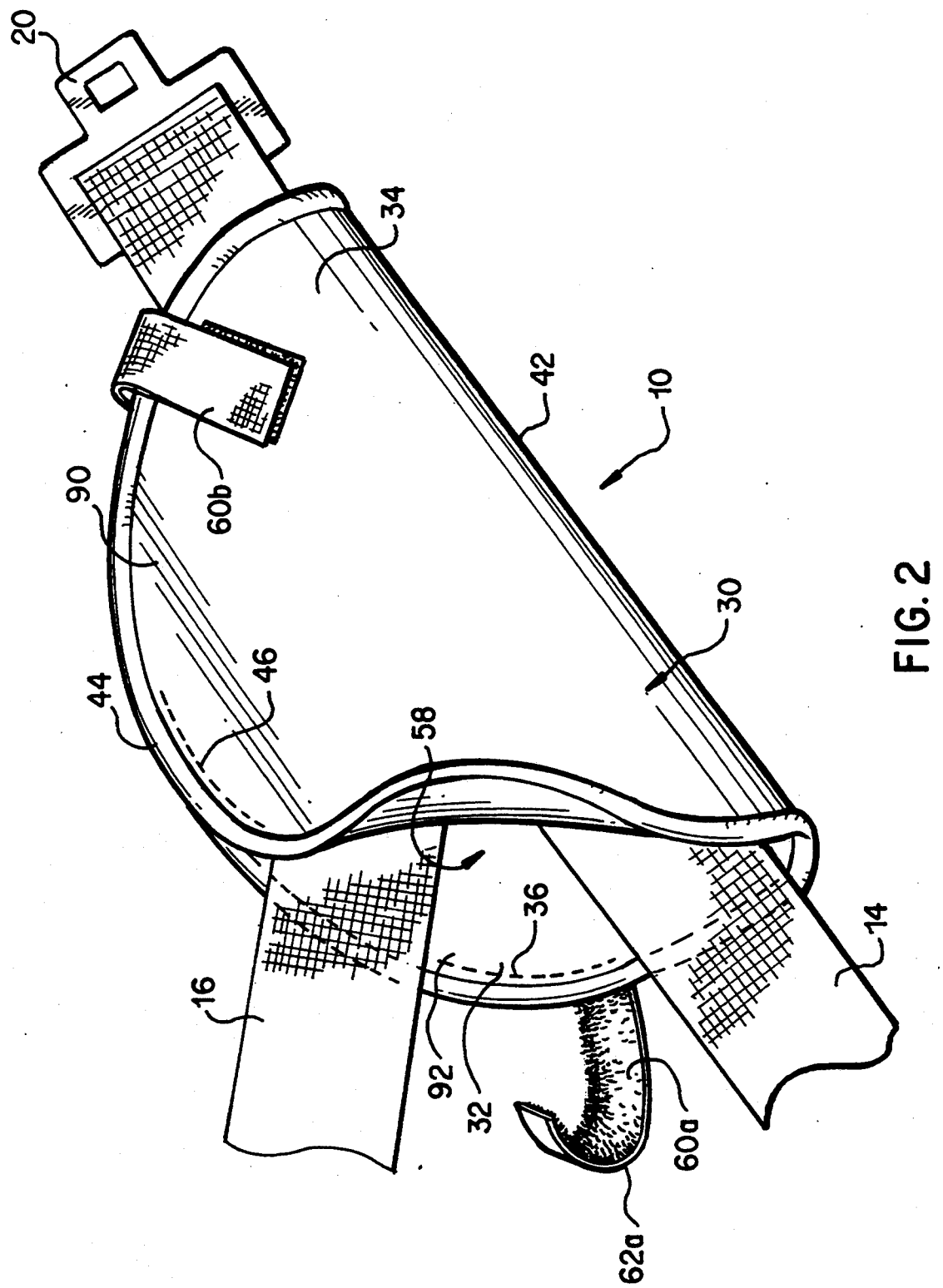
FIG. 2 is a perspective view of a seat belt adjuster according to a first embodiment of the present invention which shows a portion of the interior of the adjuster.
Figure 3:
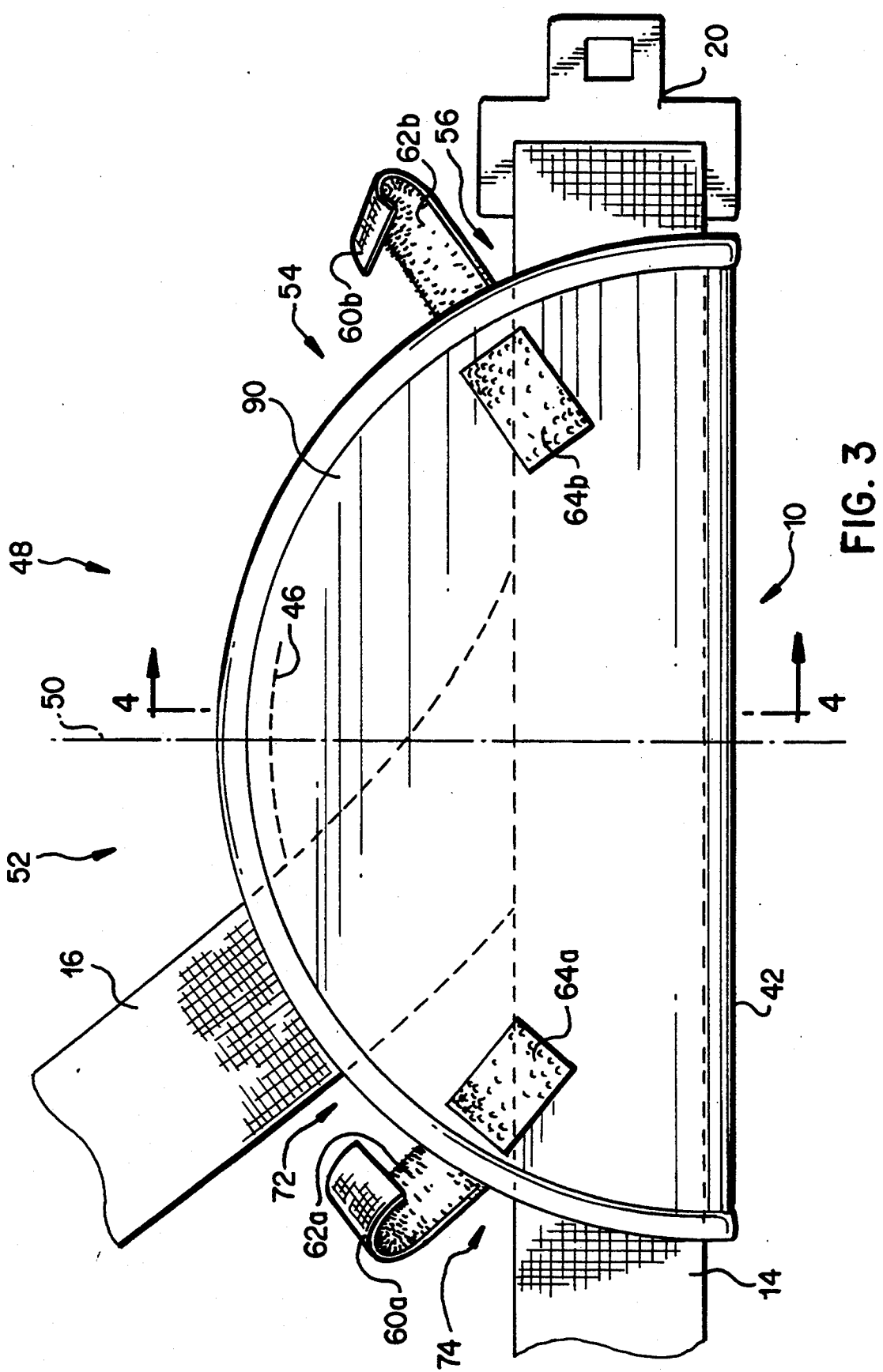
FIG. 3 is a front side view of the seat belt adjuster of FIG. 2.
Figure 4:
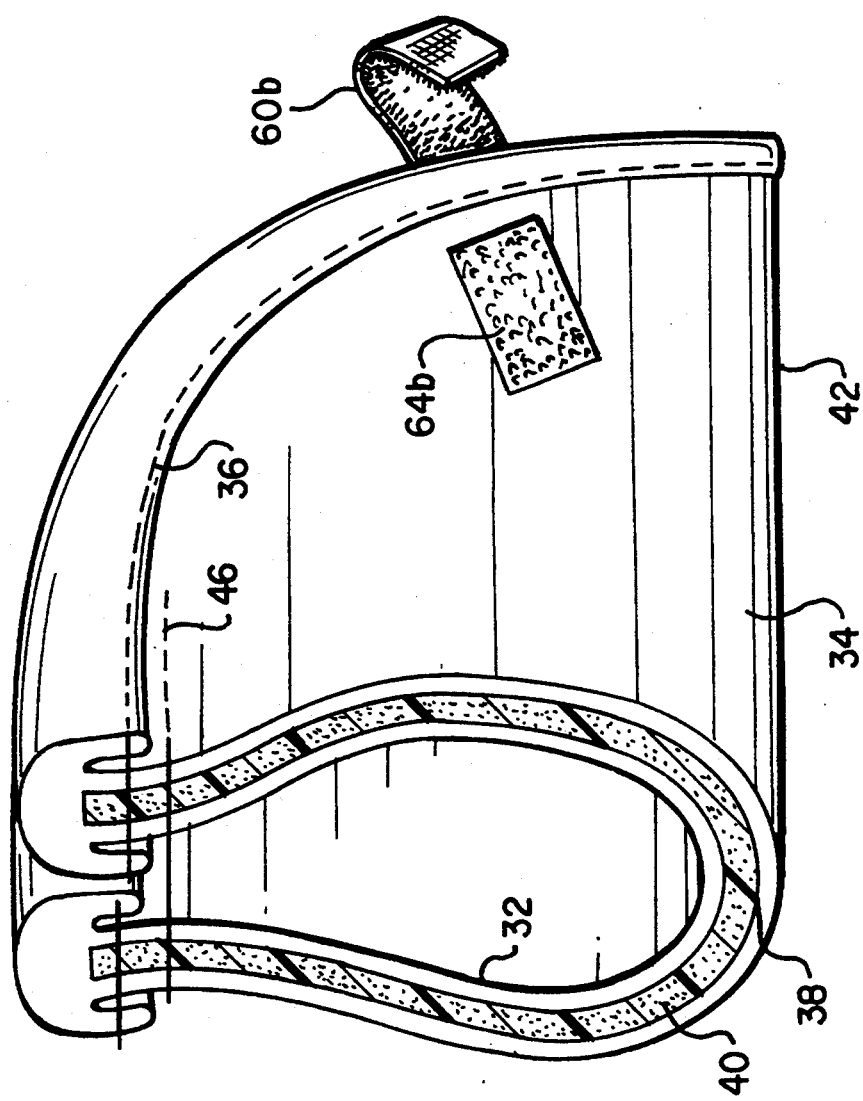
FIG. 4 is a cross-sectional view of the seat belt adjuster of FIG. 3 taken along lines 4—4 thereof.

Referring now to FIGS. 2-4, the seat belt adjuster 10 according to a first preferred embodiment comprises a panel body 30 which comprises an inside panel 32 and an outside panel 34 stitched together at their surrounding edges along stitch lines 36 to form a cavity 38 therebetween. A padding 40 is provided in the cavity 38, and is preferably made from a soft material such as foam, rubber, soft plastic, or textiles. The inside and outside panels 32 and 34 are preferably made from a soft and flexible material, such as cloth, nylon, mylar, PVC, rubber, leather or foam. The materials used for the panels 32 and 34 and the padding 40 are preferably soft, so that the seat belt adjuster 10 can rest comfortably in the waist or abdomen portion of a child. It will be appreciated that the soft materials for the padding 40 and the panels 32 and 34 are not limited to those set forth above, and that other soft materials may be used without departing from the spirit and scope of the present invention.

The shape of the body panel 30 is not critical, and may assume a rounded, curved or other shape. In the embodiment 10 of FIGS. 2–4, the body panel 30 is illustrated as being round, while in the second preferred embodiment 110 of FIG. 5, the body panel 130 is illustrated as having eight sides.

Referring back to FIGS. 2–4, the body panel 30 is folded along its center fold line 42 to form two half panels 90 and 92. A specific portion of the opposing round edges 44 of the half panels 90 and 92 can be stitched along stitch line 46. The stitch line 46 is preferably located along the central portion of the half panels 90 and 92, and extends equidistantly from either side of the center of the half panels 90 and 92, which is shown by the center line 50 in FIG. 3. The length of the stitch line 46 ranges from one to three inches, and is preferably about two inches. The stitch line 46 holds the body panel 30 in a folded configuration so that both half panels 90 and 92 are symmetrical and assume the shape of a semi-circle. The two folded half panels 90 and 92 define a channel 58 to allow a seat belt 18 to be inserted therethrough.

Alternatively, the two folded half panels 90 and 92 may be provided in the form of two separate body panels and stitched together along the bottom edges, such that the center fold line 42 would then be a stitch line. Stitch line 46 would still be used to connect the upper edges. The two separate body panels would also define a channel 58 to allow a seat belt 18 to be inserted therethrough.

The seat belt adjuster 10 has a left side 52 and a right side 48. The left side 52 has openings 72 and 74, and the right side 48 has openings 54 and 56. The openings 54, 56, 72 and 74 are defined by the spacing mechanisms described below. In particular, the left side 52 receives the waist strap 14 and the shoulder strap 16 through openings 74 and 72, respectively, and the combined straps 14 and 16 and the latch plate 20 extend out from opening 56 of the right side 48. When used in the manner shown in FIG. 3, the opening 54 on the right side 48 is not used.

According to an important aspect of the present invention, both the left side 52 and the right side 48 comprise spacing mechanisms. The spacing mechanisms must be easily detachable and re-attachable since they must allow the waist strap 14 and the shoulder strap 16 to be inserted through the channel 58 or removed therefrom, and must then operate to define the openings and to space the waist strap 14 apart from the shoulder strap 16. In the preferred embodiment shown in FIGS. 2–4, each spacing mechanism comprises a flap 60a or 60b having one end attached to the outside panel 34 of the half panel 92 and a VELCRO pad 62a or 62b provided at the other end. An opposing VELCRO pad 64 is provided on the outside panel 34 of the half panel 90 for engaging the VELCRO pad 62a or 62b on the flap 60.

Referring to FIGS. 2 and 3, when the first flap 60a is attached to the half panel 90, it defines two separate openings 74 and 72 for the waist strap 14 and shoulder strap 16, respectively, with each opening 72 and 74 communicating with the channel 58. On the other hand, when the first flap 60a is not attached to the half panel 90, the openings 72 and 74 become one large opening extending along a large portion of the left side 52 to allow the entire seat belt 18 to be inserted therethrough and into the channel 58. Therefore, the flap 60a operates to space the waist strap 14 apart from the shoulder strap 16.

The right side 48 is symmetrical to the left side 52, so that either side may accommodate the waist strap 14 and the shoulder strap 16, and either side may also allow the latch plate 20 to extend therefrom. Therefore, the second flap 60b likewise defines two separate openings 56 and 54, which may also accommodate the waist strap 14 and shoulder strap 16, respectively. Each opening 54 and 56 also communicates with the channel 58. When the second flap 60b is not attached to the half panel 90, the openings 54 and 56 become one large opening extending along a large portion of the right side 48 to allow the entire seat belt 18 to be inserted therethrough and into the channel 58. The flap 60b also operates to space the waist strap 14 apart from the shoulder strap 16. When used in this manner, the latch plate 20 extends out from the opening 74 on the left side 52, and the opening 72 is not used.

The size of the openings 72 and 54 is not critical. However, the stitch line 46 preferably extends to a point which will deflect the shoulder strap 16 sufficiently downward so that it does not interfere with the child's face.

On the other hand, the size of the openings 74 and 56 must be chosen so that the strap of the seat belt 18 can fit therethrough, but yet prevents the latch plate 20 from passing therethrough. In particular, referring to FIGS. 2 and 3, when the flap 60b is attached to the half panel 90, the latch plate 20 cannot slide back through the opening 56 into the channel 58. Thus, the flaps 60a or 60b operate not only as spacing mechanisms, but also operate to restrict or control the size of the openings 74 and 56 to prevent the latch plate 20 from sliding back into the channel 58.

Instead of the flaps 60a or 60b, other spacing mechanisms may be used without departing from the spirit and scope of the present invention. For example, opposing VELCRO pads provided on the inside panel 32 of the half panels 90 and 92 would operate in the same manner. Likewise, opposing snap-fit buttons or other similar detachable spacing mechanisms may also be provided.

In operation, a user or child first detaches the spacing mechanisms (i.e., flaps 60a and 60b). The child then pulls the latch plate 20 of the seat belt 18 and inserts the seat belt 18 through the channel 58 from the left side 52 of the body panel 30 so that the latch plate 20 extends out through the opening 56 on the right side 48. The second flap 60b is then attached to prevent the latch plate 20 from sliding back through opening 56 into the channel 58. This allows the user to use both hands to separate the waist strap 14 and the shoulder strap 16 so that these straps fit into the respective openings 74 and 72, at which point the first flap 60a is attached to space the waist strap 14 apart from the shoulder strap 16. The entire body panel 30 is pulled down to the child's 12 waist or abdomen portion and its position adjusted. The latch plate 20 is then adjusted and fastened to the buckle 22 (see FIG. 1). The user can then slide the body panel 30 along the various straps 14 and 16, if needed, so that it is comfortably fitted at the waist or abdomen of the child 12.

Of course, the method of operation described above can be altered by the user without departing from the spirit and scope of the present invention. For example, after the second flap 60b has been attached to prevent the latch plate 20 from sliding back into the channel 58, the user may choose to fasten the latch plate 20 to the buckle 22 before spacing the shoulder strap 16 from the waist strap 14. Also, the user may choose to fasten the latch plate 20 to the buckle after spacing the shoulder strap 16 from the waist strap 14, but before adjusting the position of the body panel 30. However, it is believed that the user will find it more comfortable to first properly position the body panel 30 in place before fastening the latch plate 20 to the buckle 22.

When the seat belt 18 and the seat belt adjuster 10 are to be removed, the latch plate 20 is released from the buckle 22, and the flap 60b again prevents the latch plate 20 from sliding back into the channel 58. The user can then grip the latch plate 20 with one hand while using the other hand to remove the flaps 60a and 60b to allow the seat belt adjuster 10 to be separated from the seat belt 18. Alternatively, since the flap 60a or 60b also operates to prevent the latch plate 20 from sliding back into the channel 58 and thereby keeping the latch plate 20 at the opening 74 or 56, it is possible that the seat belt adjuster 10 does not need to be removed from the seat belt 18. In this situation, the seat belt adjuster 10 may be allowed to hang freely adjacent the inside wall of the automobile from where the shoulder strap 16 would normally extend.

Thus, the seat belt adjuster 10 is very easy to use because either side 52 or 48 can be used to receive the waist strap 14 and the shoulder strap 16. This is due to the symmetrical nature of both sides 52 and 48. As a result, the user does not need to carefully inspect the seat belt adjuster 10 to determine from which side 52 or 48 the latch plate 20 must be inserted; either side 52 or 48 will be appropriate. The flaps 60a and 60b also make it convenient for the user to use the seat belt adjuster 10 because they prevent the latch plate 20 from sliding back into the channel 58, which as explained above, can be annoying. Therefore, the flaps 60a and 60b in effect provide a means for holding the latch plate 20 at the openings 56 and 74, thereby freeing one of the user's hands to manipulate the shoulder strap 16 and the waist strap 14, and to properly position the seat belt adjuster 10 during use or to remove the seat belt adjuster 10.

Figure 5:
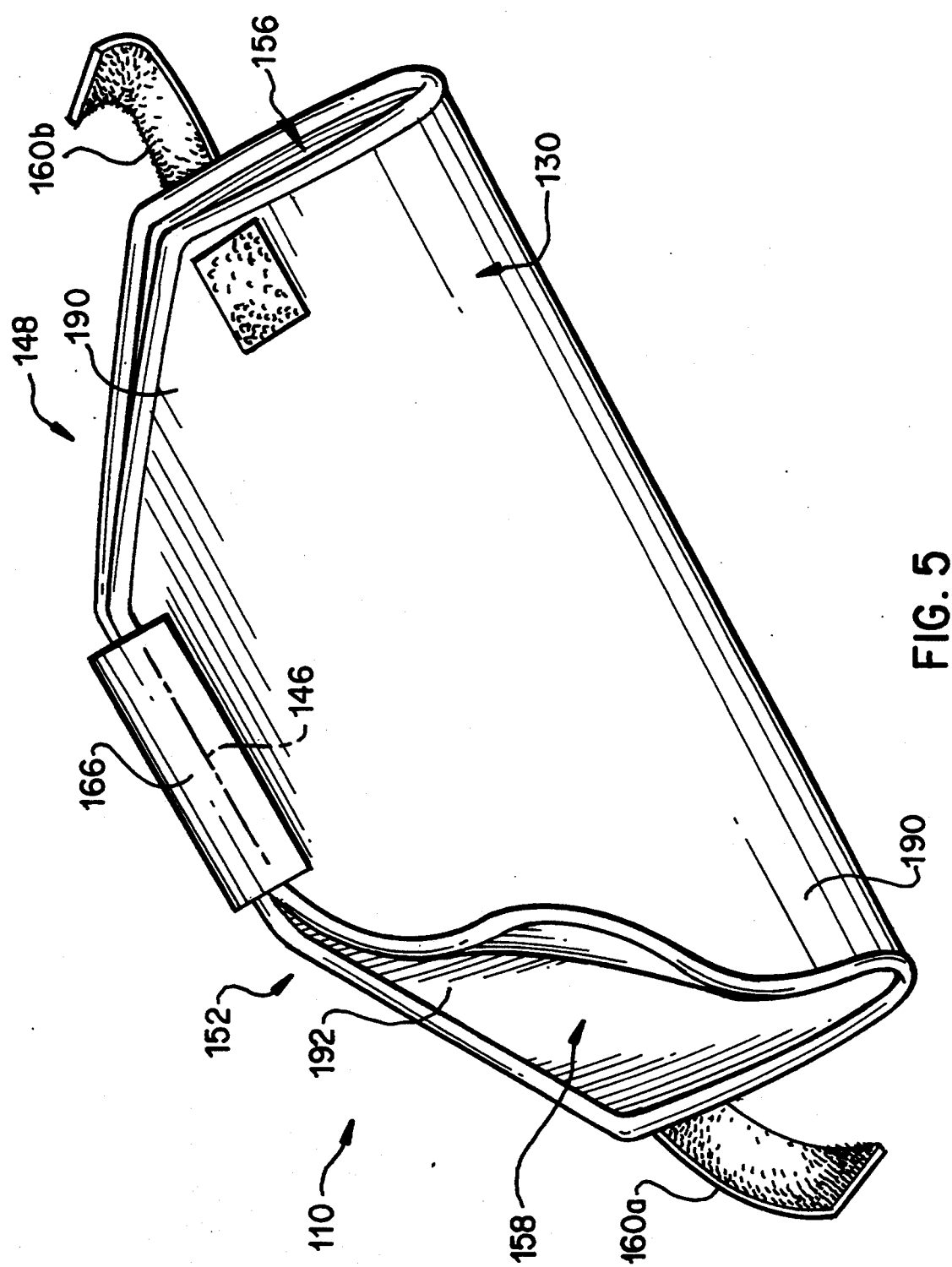

FIG. 5 illustrates a second preferred embodiment of the seat belt adjuster according to the present invention, which illustrates two modifications to the seat belt adjuster 10 of FIGS. 2–4. First, the seat belt adjuster 110 in FIG. 5 is essentially identical to seat belt adjuster 10, except that the shape of the body panel 130 is eight-sided instead of round. The eight-sided nature of the body panel 130 likewise maintains the symmetry of the half panels 190 and 192, and of the left side 152 and right side 148.

Second, a foldable flap or buckle 166 may be provided, in lieu of the stitch lines 146 (shown in FIG. 5 in imaginary dotted lines), at the location where stitch lines 146 would otherwise be provided. As with the flaps 160a and 160b, the foldable flap 166 may be provided with opposing VELCRO pads (not shown) to allow the flap 166 to attach the two half panels 190 and 192. The flap 166 may be longer in length as shown to prevent the shoulder strap 16 from interfering with the child's face. The flap 166 performs the same functions as that of the stitch line 146: to attach both half panels 190 and 192 to create the channel 158 through which the seat belt 18 passes, and to prevent the shoulder strap 16 from interfering with the child's face. However, the flap 166 makes it easier for the user to use the seat belt adjuster 110, since the user can now detach or open the flap 166 to open the body panel 130, then place the straps 14 and 16 inside the body panel 130 with the latch plate 20 protruding from the opening 156, and then close the half panels 190 and 192 by attaching the flap 166. The user can then proceed in the manner described above in connection with seat belt adjuster 10. This operation is somewhat easier than sliding the latch plate 20 and the straps 14 and 16 through one side of the seat belt adjuster 10 and out the other side. To remove the seat belt 18 and the seat belt adjuster 110, the user simply releases the latch plate 20 from the buckle 22, grips the latch plate 20, detaches the flaps 160a, 160b and 166, and removes the seat belt adjuster 110.

FIG. 6 illustrates a third preferred embodiment of the seat belt adjuster according to the present invention. Unlike the earlier embodiments, which provide two half panels to define a channel for receiving the seat belt 18, the seat belt adjuster 200 only provides one panel 202 which is similar in construction to the half panels 90 and 92 of the seat belt adjuster 10. Specifically, the panel 202 comprises a front panel 204 and a rear panel (not shown) stitched together along their edges 208 to form a cavity (not shown) therebetween, with a soft material or padding provided in the cavity.

In the seat belt adjuster 200, the seat belt 18 is secured to the adjuster 200 by means of straps 212 and 214 which are sewn or stitched in spaced-apart manner about the central portion of the panel 202, such as at 216a, 216c (for strap 212) and 216b, 216d (for strap 214). The straps 212 and 214 are preferably positioned so that the upper portions 218 and 220 of the straps 212 and 214, respectively, function to deflect the shoulder strap 16 downward to prevent it from interfering with the child's face.

Each detachable strap 224 and 226 is stitched at one end at locations 228a, 228b to the lower edge of the panel 202, with a second end having a VELCRO pad 230 attached thereto for releasably engaging an opposite VELCRO pad 232 provided on the panel 202. Detachable straps 224 and 226 perform three functions: (1) to further aid in securing the seat belt 18 to the panel 202, (2) to space the waist strap 14 apart from the shoulder strap 16 (as described in greater detail below), and (3) to hold the latch plate 20 at the detachable straps 224 and 226 (see FIG. 6).

In use, the detachable straps 224 and 226 are first detached. The shoulder strap 16 is passed through an opening 236 defined by the open space between straps 224 and 212, with the waist strap 14 passed through another opening 238 normally defined by the detachable strap 224. The seat belt assembly 18 is then positioned between the panel 202 and the straps 212 and 214, and the latch plate 20 extended through an opening 242 normally defined by the detachable strap 226. The detachable straps 226 and 224 are then attached, in that order, to the VELCRO pads 232 to securely hold the seat belt 18 to the adjuster 200. When so attached, the strap 224 separates the waist strap 14 and the shoulder strap 16, and the strap 226 prevents the latch plate 20 from sliding therethrough into the area defined by the panel 202, keeping the latch plate 20 at the location of the strap 226. The opening 240 defined by the open space between straps 214 and 226 is not used. The latch plate 20 is then fastened to the buckle 22. To remove the seat belt adjuster 200, the latch plate 20 is released from the buckle 22, the detachable straps 224 and 226 are detached, in that order, and the seat belt 18 removed from the seat belt adjuster 200.

The seat belt adjuster 200 may also be used with the shoulder strap 16 passed through opening 240 and the waist strap 14 passed through opening 242. The seat belt 18 is likewise positioned between the panel 202 and the straps 212 and 214, and the latch plate 20 extended through opening 238. The two detachable straps 224 and 226 are then attached to the VELCRO pads 232 to securely hold the seat belt 18 to the adjuster 200. Opening 236 is not used.

It will be appreciated by those skilled in the art that although only two straps 212 and 214 are shown in FIG. 6, it is possible that additional straps may be provided without departing from the spirit and scope thereof.

Thus, the seat belt adjuster 200 differs from the seat belt adjusters 10 and 110 in that no channel is needed, with the straps 212 and 214 operating to secure the seat belt 18 to the panel 202.

Accordingly, the seat belt adjusters 10, 110 and 200 according to the present invention operate to pull the shoulder strap 16 downward to a height where they do not interfere with a child's face. They are easy to use and can be adapted for use with conventional seat belts 18. They can also be adapted for use with children of different heights by merely sliding the seat belt adjuster 10, 110 or 200 to a position where it rests comfortably at a child's waist. The materials and construction of the seat belt adjusters 10, 110 and 200 provide for a comfortable fit so that children will be encouraged to use it with a seat belt 18. Once in place, the seat belt adjusters 10, 110 and 200 are both secure and reliable.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A seat belt adjuster for use with an automobile seat belt, the seat belt comprising a shoulder strap, a waist strap and a latch plate, the seat belt adjuster operating to adjust the position of the shoulder strap to prevent the strap from interfering with a user's face, the seat belt adjuster comprising:
   (i) a body panel having a central portion and first and second ends;
   (ii) a plurality of straps spaced apart along a central portion of the panel to secure the shoulder strap and the waist strap to the panel;
   (iii) a first detachable strap positioned at the first end of the panel for defining a first opening;
   (iv) a second detachable strap positioned at the second end of the panel for defining a second opening;
   (v) a third opening defined by the plurality of straps and the first detachable strap; and
   (vi) a fourth opening defined by the plurality of straps and the second detachable strap.

2. The device of claim 1, wherein the first opening is adapted to receive the waist strap, and the third opening is adapted to receive the shoulder strap, and wherein the latch plate extends through the second opening.

3. The device of claim 2 wherein the second detachable strap prevents the latch plate from passing through the second opening back to the body panel when the second detachable strap is attached to the body panel.

4. The device of claim 1, wherein the second opening is adapted to receive the waist strap, and the fourth opening is adapted to receive the shoulder strap, and wherein the latch plate extends through the first opening.

5. The device of claim 4 wherein the first detachable strap prevents the latch plate from passing through the first opening back to the body panel when the first detachable strap is attached to the body panel.

6. The device of claim 1, wherein the shoulder strap and the waist strap are positioned between the panel and the plurality of straps to secure the shoulder strap and waist strap to the panel.

7. The device of claim 6, wherein the first and second detachable straps are adapted to prevent the latch plate from passing therethrough.

8. A method of adjusting the height of a shoulder strap of a seat belt so that the shoulder strap does not interfere with an individual's face when the individual is seated in an automobile seat, the seat belt further comprising a waist strap and a latch plate, comprising the steps of:
   (a) providing a seat belt adjuster comprising:
      (i) a body panel having a central portion and first and second ends;
      (ii) a plurality of straps spaced apart along a central portion of the panel to secure the shoulder strap and the waist strap to the panel;
      (iii) a first detachable strap positioned at the first end of the panel for defining a first opening;
      (iv) a second detachable strap positioned at the second end of the panel for defining a second opening;
      (v) a third opening defined by the plurality of straps and the first detachable strap; and
      (vi) a fourth opening defined by the plurality of straps and the second detachable strap;
   (b) detaching the first and second detachable straps;
   (c) positioning the seat belt between the panel and the plurality of straps so that the latch plate extends out through the second opening;
   (d) attaching the second detachable strap to prevent the latch plate from sliding therethrough;
   (e) attaching the first detachable strap to space the waist strap apart from the shoulder strap;
   (f) positioning the seat belt adjuster at the individual's waist portion; and
   (g) fastening the latch plate to a buckle adjacent the automobile seat.

* * * * *